(12) United States Patent
Sankavaram et al.

(10) Patent No.: US 10,698,420 B2
(45) Date of Patent: Jun. 30, 2020

(54) METHOD AND APPARATUS FOR COORDINATING DEPLOYMENT OF A FLEET OF AUTONOMOUS VEHICLES

(71) Applicant: GM GLOBAL TECHNOLOGY OPERATIONS LLC, Detroit, MI (US)

(72) Inventors: Chaitanya Sankavaram, Sterling Heights, MI (US); Shiming Duan, Ann Arbor, MI (US); Yilu Zhang, Northville, MI (US); Paul E. Krajewski, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 341 days.

(21) Appl. No.: 15/688,416

(22) Filed: Aug. 28, 2017

(65) Prior Publication Data

US 2019/0064846 A1  Feb. 28, 2019

(51) Int. Cl.
| | |
|---|---|
| *G05D 1/02* | (2020.01) |
| *G08G 1/0967* | (2006.01) |
| *G08G 1/00* | (2006.01) |
| *G05D 1/00* | (2006.01) |
| *G06Q 10/06* | (2012.01) |
| *G07C 5/00* | (2006.01) |
| *G07C 5/08* | (2006.01) |

(52) U.S. Cl.
CPC ......... *G05D 1/0291* (2013.01); *G05D 1/0088* (2013.01); *G06Q 10/06* (2013.01); *G07C 5/008* (2013.01); *G07C 5/0808* (2013.01); *G08G 1/096725* (2013.01); *G08G 1/22* (2013.01)

(58) Field of Classification Search
CPC .... G05D 1/0291; G05D 1/0088; G06Q 10/06; G07C 5/008; G07C 5/0808; G08G 1/096725; G08G 1/22
See application file for complete search history.

(56) References Cited

U.S. PATENT DOCUMENTS

| | | | | |
|---|---|---|---|---|
| 9,783,024 | B2* | 10/2017 | Connell | B60H 1/00771 |
| 10,152,053 | B1* | 12/2018 | Smith | G06Q 10/08 |
| 2016/0342915 | A1* | 11/2016 | Humphrey | G06Q 10/06313 |
| 2018/0188725 | A1* | 7/2018 | Cremona | G05D 1/0027 |
| 2019/0025817 | A1* | 1/2019 | Mattingly | G06F 16/27 |
| 2019/0033856 | A1* | 1/2019 | Ferguson | G06K 9/00201 |

* cited by examiner

*Primary Examiner* — Russell Frejd
(74) *Attorney, Agent, or Firm* — Quinn IP Law

(57) ABSTRACT

A scheduling controller in communication with a plurality of autonomous vehicles is described, and includes an operator request compiler, a fleet state-of-health database, an environmental conditions compiler and a fleet scheduling controller. The fleet scheduling controller is configured to deploy the autonomous vehicles based upon inputs from the operator request compiler, the fleet state-of-health database and the environmental conditions compiler. A process for coordinating a fleet of autonomous vehicles includes determining states of health for the autonomous vehicles, and determining a desired autonomous vehicle use requirement from each of a plurality of operators that are associated with the autonomous vehicles. A usage schedule for each of the autonomous vehicles is determined based upon the states of health and the desired autonomous vehicle use requirements from the operators. The autonomous vehicles are deployed based upon the usage schedule.

19 Claims, 3 Drawing Sheets

METHOD AND APPARATUS FOR COORDINATING DEPLOYMENT OF A FLEET OF AUTONOMOUS VEHICLES

INTRODUCTION

Autonomous vehicles can include on-board monitoring systems to detect occurrence of a fault or another indication of a need for service and/or vehicle maintenance.

SUMMARY

A scheduling controller in communication with a plurality of autonomous vehicles is described, and includes an operator request compiler, a fleet state-of-health database, an environmental conditions compiler and a fleet scheduling controller. The fleet scheduling controller is configured to deploy the plurality of autonomous vehicles based upon inputs from the operator request compiler, the fleet state-of-health database and the environmental conditions compiler.

An aspect of the disclosure includes a process for coordinating a fleet of autonomous vehicles, which includes determining, via a wireless communication device, a state of health of each of a plurality of autonomous vehicles, and determining a desired autonomous vehicle use requirement from each of a plurality of operators that are associated with the plurality of autonomous vehicles. A usage schedule for each of the autonomous vehicles is determined based upon the states of health of the autonomous vehicles and the desired autonomous vehicle use requirements from the operators. The autonomous vehicles are deployed based upon the usage schedule.

Another aspect of the disclosure includes a method for coordinating a fleet of autonomous vehicles via a remote controller that includes determining, via a wireless communication device, a state of health of each of a plurality of autonomous vehicles and determining, via the remote controller, a desired autonomous vehicle use requirement from an operator. A usage schedule for each of the autonomous vehicles can be determined based upon the states of health of the autonomous vehicles and the desired autonomous vehicle use requirement from the operator. One of the autonomous vehicles can be deployed to serve the operator based upon the usage schedule.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

Figure 1:
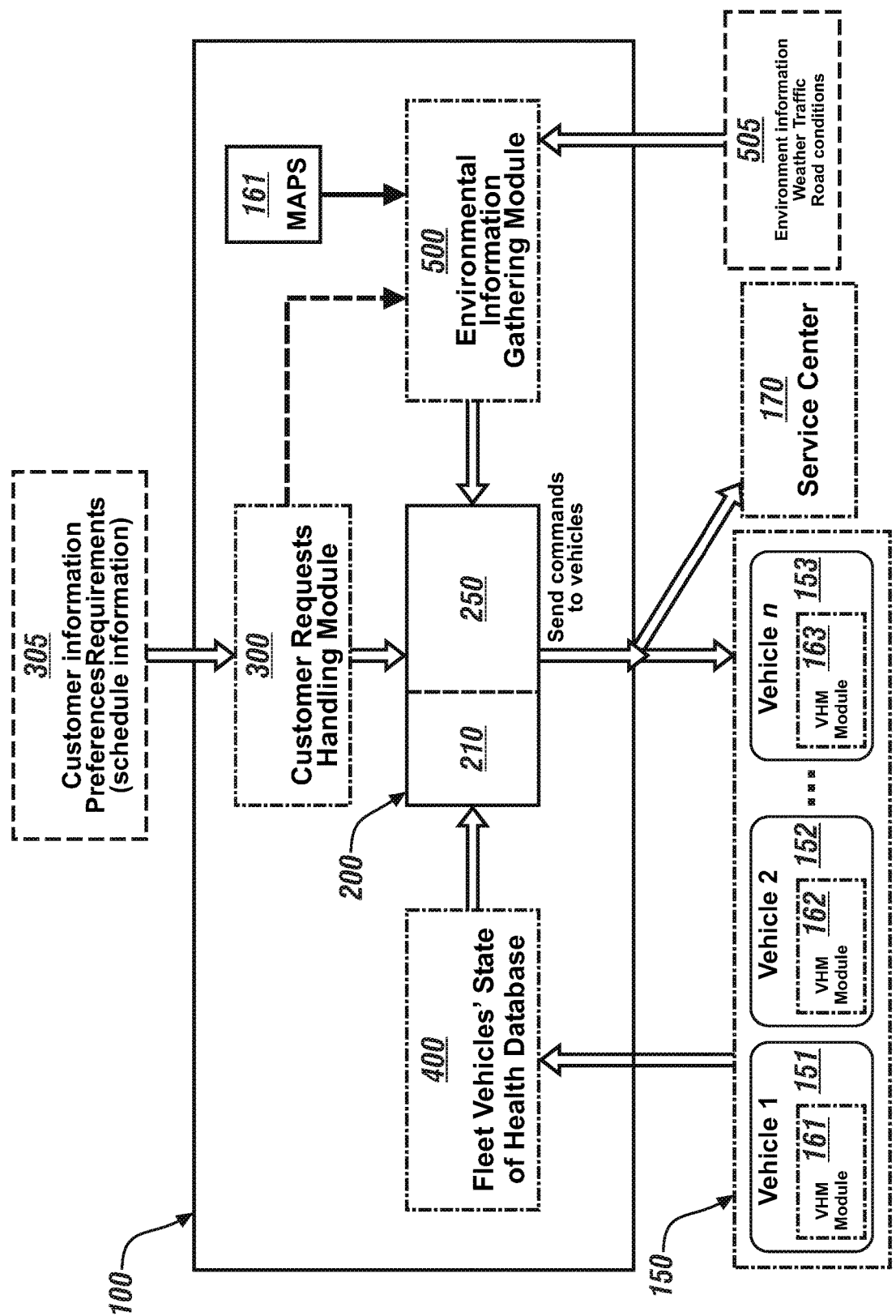
FIG. 1 schematically illustrates an architecture in the form of a scheduling controller having a plurality of associated routines and databases that is configured to coordinate deployment of a fleet of remotely located autonomous vehicles, in accordance with the disclosure.

Referring to the drawings, wherein like reference numerals correspond to like or similar components throughout the several Figures, FIG. 1, consistent with embodiments disclosed herein, illustrates an architecture in the form of a scheduling controller 100 having a plurality of associated routines and databases that is configured to coordinate deployment of a fleet of remotely located vehicles 150. In one embodiment, each of the vehicles 150 is an autonomous vehicle. Alternatively, the vehicles can be a vehicle that is included in a private or public fleet that includes an on-vehicle telematics controller that is capable of communications with an off-board controller. The scheduling controller 100 is configured to coordinate deployment based upon the states of health of the vehicles 150, desired autonomous vehicle use requirements from a plurality of operators, and other factors. The scheduling controller 100 coordinates and commands deployment of each of the fleet of autonomous vehicles 150 to the operators and/or a service center 170. The scheduling controller 100 includes an operator request compiler 300, a fleet SOH database 400, an environmental conditions compiler 500, and a fleet scheduling controller 200.

The fleet of autonomous vehicles 150 is composed of a plurality of autonomous vehicles, including a first autonomous vehicle 151, a second autonomous vehicle 152 and an $n^{th}$ autonomous vehicle 153, wherein the "$n^{th}$" designation indicates a finite quantity of autonomous vehicles associated with a fleet. The first, second, and $n^{th}$ autonomous vehicles 151, 152, 153 each includes a vehicle health monitoring (VHM) controller 161, 162, 163, respectively, which communicates via an on-vehicle telematics controller to the fleet SOH database 400 of the scheduling controller 100. The term "fleet" is employed to describe a defined group of vehicles having autonomous vehicle functionality, and can be associated with a private entity, such as a business or service organization, a public entity such as a school district, or another entity, such as a vehicle ride-share or other subscription service. The first, second, and $n^{th}$ autonomous vehicles 151, 152, 153 include, in one embodiment, four-wheel vehicles with steerable front wheels and fixed rear wheels. They include, by way of non-limiting examples, a passenger vehicle, a light-duty or heavy-duty truck, a utility vehicle, an agricultural vehicle, an industrial/warehouse vehicle, or a recreational off-road vehicle. Alternatively, other vehicles may be employed within the scope of this disclosure. As employed herein, each of the first, second, and $n^{th}$ autonomous vehicles 151, 152, 153 includes an on-vehicle control system that is capable of providing a level of autonomic vehicle control. The term 'operator' describes the person responsible for directing operation of the vehicle, whether actively involved in controlling one or more vehicle functions or directing autonomous vehicle operation.

The level of autonomic vehicle control can be defined by on-vehicle devices and controllers that are configured to execute a range of dynamic driving and vehicle operating modes. Autonomic vehicle control can include simultaneous automatic control of vehicle driving functions, including steering, acceleration, and braking, wherein the operator cedes control of the vehicle for a period of time during a trip. Autonomic vehicle control can include simultaneous automatic control of the vehicle driving functions, including steering, acceleration, braking and route planning wherein the operator cedes control of the vehicle for an entire trip. The on-vehicle devices and controllers that effect autonomic vehicle control include hardware and controllers that are configured to monitor the driving environment under various driving modes and perform various driving tasks during dynamic operation. Autonomic vehicle control can include, by way of non-limiting examples, hardware, i.e., actuators and sensors, and controllers, which are configured to execute acceleration, braking, steering, cruise control, adaptive cruise control, lane-change warning, automatic parking, navigation and the like.

The VHM controllers 161, 162, 163 are each disposed to monitor, prognosticate and/or diagnose operation of the respective first, second, and $n^{th}$ autonomous vehicles 151, 152, 153. The vehicle systems, subsystems and controllers associated with the autonomic vehicle control are implemented to execute one or a plurality of operations associated with autonomous vehicle functions, including, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, navigation, route planning, etc. The vehicle systems and associated controllers of each autonomous vehicle can include, by way of non-limiting examples, a drivetrain and drivetrain controller; a steering system, a braking system and a chassis system, which are controlled by a vehicle controller; a vehicle spatial monitoring system and spatial monitoring controller; a human-machine interface (HMI) system and HMI controller; an HVAC system and associated HVAC controller; operator controls and an associated operator controller; and a navigation, GPS, and/or infotainment system and associated controller(s). Each of the vehicle systems and associated controllers may further include one or more subsystems and associated controller. The subsystems and controllers are shown as discrete elements for ease of description. The foregoing classification of the subsystems is provided for purposes of describing one embodiment, and is illustrative. Other configurations may be considered within the scope of this disclosure. It should be appreciated that the functions described and performed by the discrete elements may be executed using one or more devices that may include algorithmic code, calibrations, hardware, application-specific integrated circuitry (ASIC), and/or off-board or cloud-based computing systems. Each of the drivetrain controller, vehicle controller, spatial monitoring controller, HMI controller, operator controller and HVAC controller includes a VHM agent, which can be implemented and executed as algorithmic code, calibrations, hardware, application-specific integrated circuitry (ASIC), or other elements. Each of the VHM agents is configured to perform component and sub-system monitoring, feature extraction, data filtering and data recording for the associated controller. The data recording can include periodic and/or event-based data recording, single time-point data recording and/or consecutive time-point data recording for certain time duration, such as before and/or after the trigger of an event. Such data recording can be accomplished employing circular memory buffers or another suitable memory device. The VHM controllers 161, 162, 163 are each composed of the VHM agents for the drivetrain controller, vehicle controller, spatial monitoring controller, HMI controller, operator controller and HVAC controller for the respective first, second, and $n^{th}$ autonomous vehicles 151, 152, 153.

Each of the first, second, and $n^{th}$ autonomous vehicles 151, 152, 153 wirelessly communicates a portion or all of the results from the VHM controllers 161, 162, 163 to the fleet SOH database 400, which compiles the results and communicates the results to the fleet scheduling controller 200.

The operator request compiler 300 communicates with and compiles operator requests for vehicle usage 305. In one embodiment, each operator can access a vehicle request form to generate an operator request for vehicle usage 305, which can be implemented as a software application on a personal handheld device such as a smart phone. The vehicle request form can include information related to when (date/time) one of the autonomous vehicles is needed, duration of the need for the autonomous vehicle, nature of the need for the autonomous vehicle, such as for transportation, material handling, etc., quantity of passengers, customer-specific preferences for a high performance vehicle or other. The operator requests for vehicle usage 305 are communicated to the operator request compiler 300, which can compile and categorize the requests based on criteria such as how long the vehicle is needed, when the vehicle is needed, operator-specific preferences (e.g., truck, high performance, etc.), multiple requests from a specific location, and other factors. The operator request compiler 300 compiles the results and communicates the results to the fleet scheduling controller 200.

The environmental conditions compiler 500 communicates with information suppliers to capture environmental information 505, which can include weather conditions and forecasts, traffic conditions, road conditions, including location of construction and other information. The environmental information 505 is communicated to the environmental conditions compiler 500, which compiles the information. The environmental conditions compiler 500 also monitors and receives information from a maps program 161, which is a computer-based database that delineates geographic and physical features of a defined area, including roads, buildings, businesses, etc. The environmental conditions compiler 500 compiles weather information, traffic conditions, road conditions etc. based on the customer's destination location that is provided by the operator request compiler 300 for each customer's vehicle request. The environmental conditions compiler 500 communicates the results to the fleet scheduling controller 200.

The fleet scheduling controller 200 monitors inputs from the operator request compiler 300, the environmental conditions compiler 500 and the fleet SOH database 400. The fleet scheduling controller 200 executes a first process 210 and a second process 250 to determine and command deployment of the first, second, and $n^{th}$ autonomous vehicles 151, 152, 153.

The first process 210 is described with reference to FIG. 2, and takes into account the fleet vehicle's state of health and the customer requirements along with the environment conditions to assign appropriate vehicle and sends commands to the autonomous onboard module with the customer request/schedule and the navigation information.

The second process 250 is described with reference to FIG. 3, and includes ongoing communication with the fleet SOH database 400 to determine whether a particular customer requirement can be met. In the event that the requirements cannot be met, alternate arrangements are made.

Figure 2:
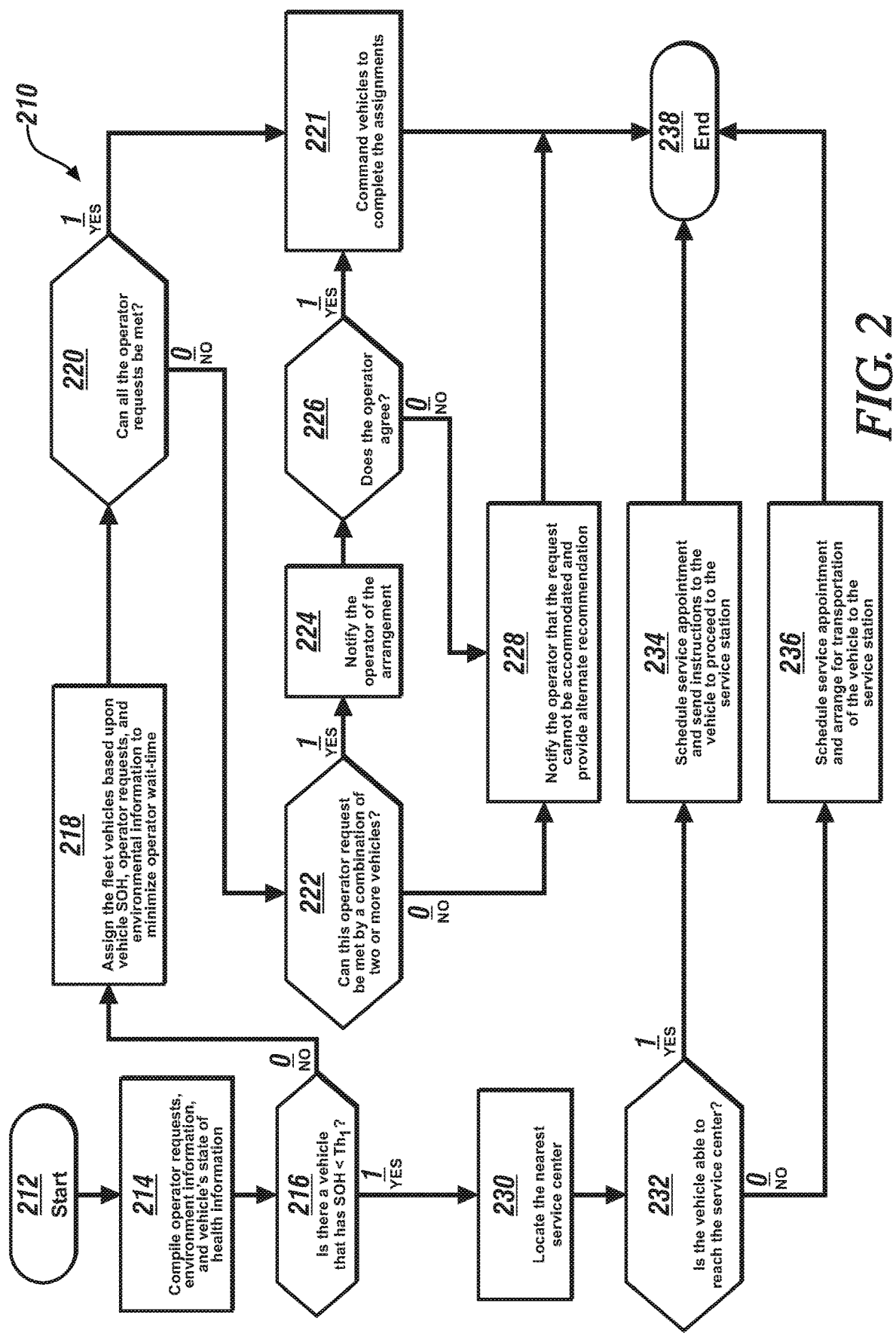
FIG. 2 schematically shows a first process that is related to handling a new request from an operator to schedule one of a plurality of autonomous vehicles in a fleet, in accordance with the disclosure.

FIG. 2 schematically shows the first process 210, which is related to handling a new request from an operator to schedule one of the fleet vehicles. The first process takes into account the fleet vehicle's state of health and the customer requirements along with the environment conditions to assign appropriate vehicle and sends commands to the autonomous onboard module with the operator request as scheduled and the navigation information. Table 1 is provided as a key wherein the numerically labeled blocks and the corresponding functions are set forth as follows, corresponding to the first process 210. The teachings may be described herein in terms of functional and/or logical block components and/or various processing steps. It should be realized that such block components may be composed of hardware, software, and/or firmware components that have been configured to perform the specified functions.

TABLE 1

| BLOCK | BLOCK CONTENTS |
|---|---|
| 212 | Start iteration |
| 214 | Compile operator requests, environmental information and vehicle SOH information |
| 216 | Is there a vehicle that has a SOH < threshold ($Th_1$)? |
| 218 | Assign the fleet vehicles based upon vehicle SOH, operator requests, and environmental information to minimize operator wait-time |
| 220 | Can all operator requests be met based upon vehicle SOH? |
| 221 | Command the fleet of vehicles to complete assignments |
| 222 | Can this operator request be met by a combination of two or more of the vehicles? |
| 224 | Notify the operator of the arrangement |
| 226 | Does operator agree with the arrangement? |
| 228 | Notify the operator that the request cannot be accommodated and provide alternate recommendation |
| 230 | Locate nearest service center |
| 232 | Is the vehicle able to reach the service center in view of its SOH? |
| 234 | Schedule service appointment; send instructions to the vehicle to proceed to the service center |
| 236 | Schedule service appointment; arrange for transportation of the vehicle to the service center |
| 238 | End iteration |

Execution of the first process 210 may proceed as follows. The steps of the first process 210 may be executed in a suitable order, and are not limited to the order described with reference to FIG. 2.

The first process 210 executes periodically in one embodiment. Upon initiation, the first process 210 starts (212) by compiling operator requests, environmental information and vehicle SOH information for the autonomous vehicles in the fleet (214). The SOH information is evaluated to determine whether one or more of the autonomous vehicles of the fleet has a SOH that is less than a threshold SOH (216).

When one of the autonomous vehicles of the fleet has a SOH that is less than the threshold SOH (216)(1), the nearest service center is located by the fleet scheduling controller 200 (230), and it is determined whether the autonomous vehicle is able to reach the service center in view of its SOH (232). This determination is based upon whether the autonomous vehicle is capable of operating in view of its SOH of the hardware and controllers that are configured to execute acceleration, braking, steering, cruise control, adaptive cruise control, lane-change warning, automatic parking, navigation and the like. When the autonomous vehicle is able to reach the service center in view of its SOH (232)(1), a service appointment is scheduled and instructions are sent to the autonomous vehicle to proceed to the service center (234), and this iteration ends (238). When the autonomous vehicle is unable to reach the service center in view of its SOH (232)(0), a service appointment is scheduled and transportation to the service center is arranged (236), and this iteration ends (238).

When all the autonomous vehicles of the fleet have SOHs that are greater than the threshold SOH (216)(0), the autonomous vehicles are assigned to the operators based upon the vehicle SOH, the operator requests and the environmental information in a manner that minimizes operator wait-time (218). It is also determined whether all of the operator requests can be met in view of the SOHs of the autonomous vehicles (220). If so (220)(1), the autonomous vehicles are commanded to complete their assignments (221), and this iteration ends (238).

When all of the operator requests cannot be met in view of the SOHs of the autonomous vehicles (220)(0), the individual operator requests are evaluated to determine whether any of the operator requests can be met by deploying multiple ones of the autonomous vehicles, i.e., deploying a combination of two or more of the autonomous vehicles (222). If so (222)(1), the operator is notified of the arrangement (224), who has the option to agree (226). If the operator agrees (226)(1), the autonomous vehicles are commanded to complete their assignments (221), and this iteration ends (238). If the operator does not agree to the arrangement (226)(0), an alternative recommendation is provided (228), and this iteration ends (238) without meeting the request.

If the operator request cannot be met by a combination of two or more of the autonomous vehicles (222)(0), the operator is notified of the result and an alternative recommendation is developed and provided (228) and this iteration ends (238).

Figure 3:
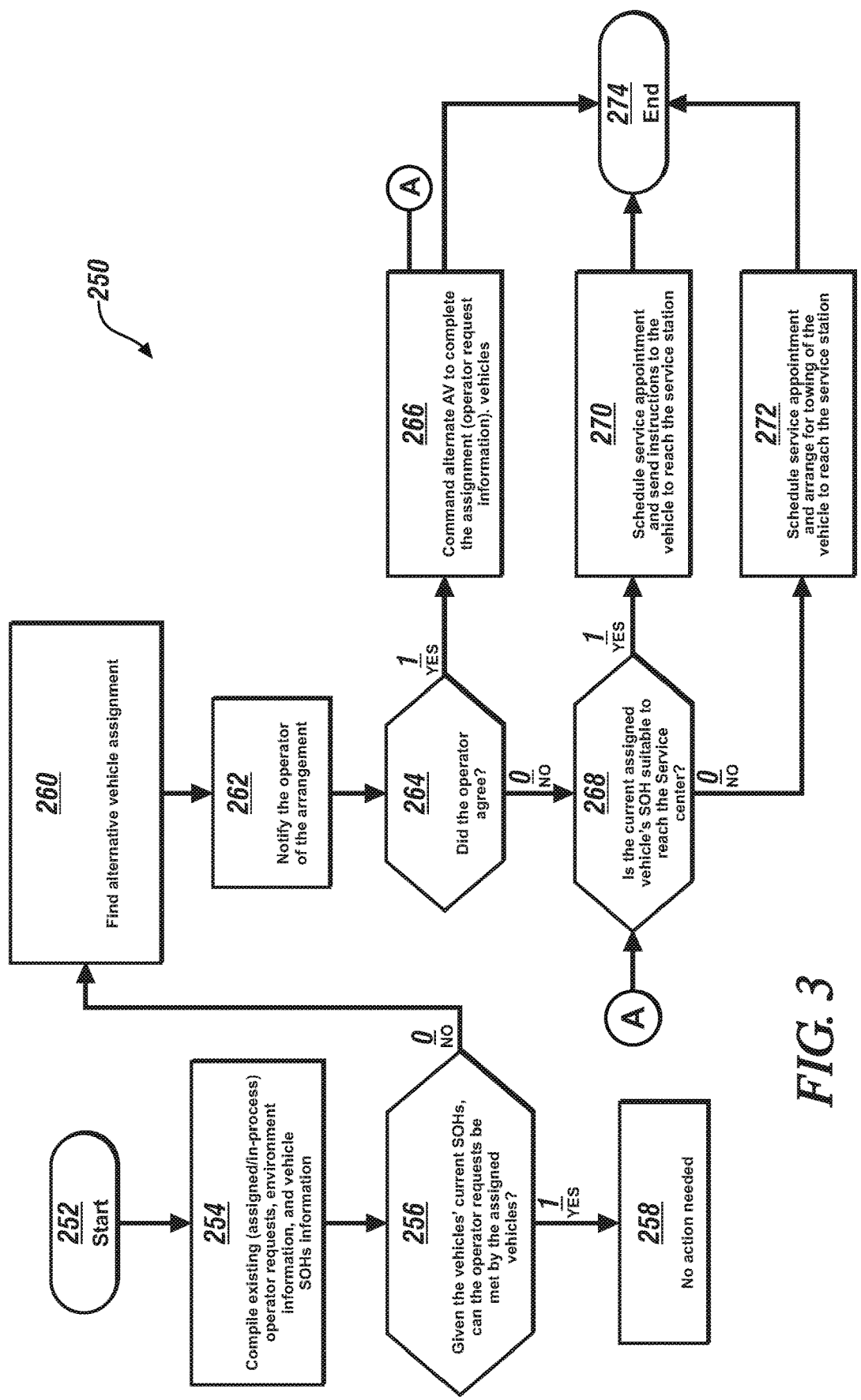
FIG. 3 schematically shows a second process that is related to determining whether a particular customer requirement can be met in view of SOH of one or more of the autonomous vehicles in a fleet, in accordance with the disclosure.

FIG. 3 schematically shows the second process 250, which includes ongoing communication with the fleet SOH database 400 to determine whether a particular customer requirement can be met in view of SOH of one or more of the fleet vehicles. In the event that the requirements cannot be met, alternate arrangements are made. The second process 250 takes into account the fleet vehicle's state of health and the customer requirements along with the environment conditions to assign one of the autonomous vehicles and sends commands to an on-vehicle controller disposed to effect autonomous vehicle operation with the customer request/schedule and the navigation information.

Table 2 is provided as a key wherein the numerically labeled blocks and the corresponding functions are set forth as follows, corresponding to the second process 250. The teachings may be described herein in terms of functional and/or logical block components and/or various processing steps. It should be realized that such block components may be composed of hardware, software, and/or firmware components that have been configured to perform the specified functions.

TABLE 2

| BLOCK | BLOCK CONTENTS |
|---|---|
| 252 | Start iteration |
| 254 | Compile operator requests, environment information, and autonomous vehicles states of health information |
| 256 | Can all operator requests be met based upon vehicle SOH? |
| 258 | No action needed |
| 260 | Find alternate vehicle assignment |
| 262 | Notify the operator of the arrangement |
| 264 | Does operator agree with arrangement? |
| 266 | Command alternate autonomous vehicle to complete the assignment |
| 268 | Is first autonomous vehicle able to reach the service center in view of its SOH? |
| 270 | Schedule service appointment; send instructions to the first autonomous vehicle to proceed to the service center |
| 272 | Schedule service appointment; arrange for transportation of first autonomous vehicle to the service center |
| 274 | End iteration |

Execution of the second process 250 may proceed as follows. The steps of the second process 250 may be executed in a suitable order, and are not limited to the order described with reference to FIG. 3.

The second process 250 executes periodically in one embodiment. Upon initiation, the second process 250 starts (252) by compiling operator requests, environmental information, and vehicle SOH information for the autonomous vehicles in the fleet (254). The SOH information is evaluated to determine whether the operator requests can be met based upon the vehicle SOH (256). If so (256)(1), no further action is needed (258), and the autonomous vehicles are assigned to the operators based upon the vehicle SOHs, the operator requests and the environmental information in a manner that minimizes operator wait-time.

When SOH information for one of the autonomous vehicles indicates that one of the operator requests cannot be met based upon the specific vehicle SOH (256)(0), an alternate vehicle assignment is determined based on operator preference(s) and the environment information (260), and the operator is notified of the arrangement for their concurrence (262), including assignment of an alternate vehicle arrangement based on vehicle's current state of health, operator preference(s), and environment information. The operator is notified of the arrangement with the option to agree (264).

When the operator agrees to the alternate autonomous vehicle arrangement (264)(1), the alternate autonomous vehicle is commanded to complete the assignment (266), and the originally scheduled autonomous vehicle that requires service is scheduled as follows. This also executes as follows when the operator does not agree to the alternate autonomous vehicle arrangement (264)(0). In either event, the nearest service center is located by the fleet scheduling controller 200 and it is determined whether the autonomous vehicle is able to reach the service center in view of its SOH (268). This determination is based upon whether the autonomous vehicle is capable of operating in view of its SOH of the hardware and controllers that are configured to execute acceleration, braking, steering, cruise control, adaptive cruise control, lane-change warning, automatic parking, navigation and the like. When the autonomous vehicle is able to reach the service center in view of its SOH (268)(1), a service appointment is scheduled and instructions are sent to the autonomous vehicle to proceed to the service center (270), and this iteration ends (274). When the autonomous vehicle is unable to reach the service center in view of its SOH (268)(0), a service appointment is scheduled and transportation to the service center is arranged (272), and this iteration ends (274).

The concepts described herein can be employed to coordinate and schedule autonomous fleet vehicles, including integrating environmental information (weather, road conditions etc.) in choosing an appropriate autonomous vehicle based upon vehicle SOH information.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for coordinating a fleet of autonomous vehicles via a remote controller, comprising:
   within the remote controller, via a wireless communications device, communicating with a vehicle health monitoring controller within each of a plurality of autonomous vehicles to acquire a state of health for each of the plurality of autonomous vehicles;
   determining, via the remote controller, a desired autonomous vehicle use requirement from each of a plurality of operators;
   determining a usage schedule for each of the autonomous vehicles based upon the states of health of the autonomous vehicles and the desired autonomous vehicle use requirements from the operators; and
   deploying, via the remote controller, each of the autonomous vehicles based upon the usage schedule.

2. The method of claim 1, further comprising:
   determining environmental conditions, and
   determining a usage schedule for each of the autonomous vehicles based upon the states of health of the autonomous vehicles, the desired autonomous vehicle use requirements from the operators and the environmental conditions.

3. The method of claim 2, wherein the desired autonomous vehicle use requirement includes a desired destination, and
   wherein the environmental conditions include ambient environmental conditions, road conditions and traffic conditions associated with traversing from a point of origin for the autonomous vehicle to the desired destination.

4. The method of claim 3, wherein the environmental conditions include geographic and physical features of an area that is associated with traversing from the point of origin for the autonomous vehicle to the desired destination.

5. The method of claim 1, wherein deploying, via the remote controller, each of the autonomous vehicles based upon the usage schedule further comprises deploying one of the autonomous vehicles having a state of health less than a threshold to a service center.

6. The method of claim 1, wherein deploying, via the remote controller, each of the autonomous vehicles based upon the usage schedule further comprises arranging for transportation of one of the autonomous vehicles having a state of health less than a threshold to a service center.

7. The method of claim 1, wherein deploying, via the remote controller, each of the autonomous vehicles based upon the usage schedule comprises deploying multiple ones of the autonomous vehicles to meet a desired autonomous vehicle use requirement from one of the operators.

8. The method of claim 1, wherein determining a usage schedule for each of the autonomous vehicles based upon the states of health of the autonomous vehicles and the desired autonomous vehicle use requirements from the operators further comprises determining a usage schedule for all of the autonomous vehicles that minimizes wait-times of the operators.

9. A scheduling controller in communication with a plurality of autonomous vehicles, comprising:
   an operator request compiler;
   a fleet state-of-health database;
   an environmental conditions compiler; and
   a fleet scheduling controller;
   wherein the scheduling controller is operative to communicate via wireless communication with a vehicle health monitoring controller within each of the plurality of autonomous vehicles;
   wherein the scheduling controller stores data from each of the vehicle health monitoring controllers within the fleet state-of-health database; and
   wherein the fleet scheduling controller is configured to deploy the plurality of autonomous vehicles based upon inputs from the operator request compiler, the fleet state-of-health database and the environmental conditions compiler.

10. The scheduling controller of claim 9, wherein the operator request compiler is configured to determine, from each of a plurality of operators, desired autonomous vehicle use requirements including a point of origin and a desired destination.

11. The scheduling controller of claim 10, wherein the environmental conditions compiler is configured to determine ambient environmental conditions, road conditions and traffic conditions associated with traversing from the point of origin to the desired destination associated with the desired autonomous vehicle use requirements from each of the plurality of operators.

12. The scheduling controller of claim 11, wherein the environmental conditions include geographic and physical features of an area that is associated with traversing from the point of origin for the autonomous vehicle to the desired destination.

13. The scheduling controller of claim 9, wherein the environmental conditions compiler is configured to determine environmental conditions including ambient environmental conditions, road conditions and traffic conditions.

14. A method for coordinating a fleet of autonomous vehicles via a remote controller, comprising:
   determining, via a wireless communication device, a state of health of each of a plurality of autonomous vehicles;
   within the remote controller, via a wireless communications device, communicating with a vehicle health monitoring controller within each of a plurality of autonomous vehicles to acquire a state of health for each of the plurality of autonomous vehicles;
   determining, via the remote controller, a desired autonomous vehicle use requirement from an operator;
   determining a usage schedule for each of the autonomous vehicles based upon the states of health of the autonomous vehicles and the desired autonomous vehicle use requirement from the operator; and
   deploying, via the remote controller, one of the autonomous vehicles to serve the operator based upon the usage schedule.

15. The method of claim 14, further comprising:
   determining environmental conditions, and
   determining a usage schedule for each of the autonomous vehicles based upon the states of health of the autonomous vehicles, the desired autonomous vehicle use requirements from the operator and the environmental conditions.

16. The method of claim 15, wherein the desired autonomous vehicle use requirement includes a desired destination for the operator, and
   wherein the environmental conditions include ambient environmental conditions, road conditions and traffic conditions associated with traversing from a point of origin for the autonomous vehicle to the desired destination for the operator.

17. The method of claim 16, wherein the environmental conditions include geographic and physical features of an area that is associated with traversing from the point of origin for the autonomous vehicle to the desired destination for the operator.

18. The method of claim 14, further comprising deploying multiple ones of the autonomous vehicles to meet the desired autonomous vehicle use requirement from the operator.

19. The method of claim 14, wherein determining a usage schedule for each of the autonomous vehicles based upon the states of health of the autonomous vehicles and the desired autonomous vehicle use requirement from the operator further comprises determining a usage schedule for all of the autonomous vehicles that minimizes a wait-time of the operator.

* * * * *